US008898477B2

(12) United States Patent
Prevost et al.

(10) Patent No.: US 8,898,477 B2
(45) Date of Patent: Nov. 25, 2014

(54) SYSTEM AND METHOD FOR SECURE FIRMWARE UPDATE OF A SECURE TOKEN HAVING A FLASH MEMORY CONTROLLER AND A SMART CARD

(75) Inventors: Sylvain Prevost, Austin, TX (US); Ksheerabdhi Krishna, Cedar Park, TX (US); Ruchirkumar D Shah, San Jose, CA (US); Mehdi Asnaashari, Danville, CA (US)

(73) Assignee: Gemalto Inc., Austin, TX (US)

( * ) Notice: Subject to any disclaimer, the term of this patent is extended or adjusted under 35 U.S.C. 154(b) by 1891 days.

(21) Appl. No.: 11/938,769

(22) Filed: Nov. 12, 2007

(65) Prior Publication Data
US 2010/0023777 A1   Jan. 28, 2010

(51) Int. Cl.
G06F 11/30   (2006.01)
G06F 21/57   (2013.01)

(52) U.S. Cl.
CPC .................................. G06F 21/572 (2013.01)
USPC ............ 713/189; 713/161; 713/168; 713/170; 713/176; 726/2; 726/9; 726/30; 717/168; 717/173

(58) Field of Classification Search
USPC .......... 713/189, 161, 168, 170, 176; 711/111; 717/168–173; 726/2, 9, 30
See application file for complete search history.

(56) References Cited

U.S. PATENT DOCUMENTS

| 5,901,311 A | 5/1999 | Labatte et al. |
| 6,266,736 B1 | 7/2001 | Atkinson et al. |
| 6,330,653 B1 | 12/2001 | Murray et al. |
| 6,581,159 B1* | 6/2003 | Nevis et al. ........................ 713/2 |
| 6,757,783 B2 | 6/2004 | Koh |
| 6,868,480 B2 | 3/2005 | Nakajima |
| 7,117,288 B2 | 10/2006 | Huang |
| 7,370,166 B1 | 5/2008 | Ramesh et al. |
| 2002/0095501 A1 | 7/2002 | Chiloyan et al. |
| 2002/0169960 A1 | 11/2002 | Iguchi et al. |
| 2003/0070083 A1 | 4/2003 | Nessler |
| 2003/0154355 A1 | 8/2003 | Fernandez |
| 2004/0059916 A1* | 3/2004 | Mizushima et al. .......... 713/172 |

(Continued)

FOREIGN PATENT DOCUMENTS

| JP | 62-236055 | 10/1987 |
| JP | 2008167013 | 6/1996 |
| JP | 2002-229861 | 8/2002 |
| WO | 2004081706 A2 | 9/2004 |

OTHER PUBLICATIONS

Brian Dipert; Flash memory goes mainstream; Oct. 1993; IEEE; pp. 48-51.*

(Continued)

*Primary Examiner* — Saleh Najjar
*Assistant Examiner* — Peiliang Pan
(74) *Attorney, Agent, or Firm* — The Jansson Firm; Pehr B. Jansson

(57) ABSTRACT

A system and method of operating a device to securely update the control firmware controlling the device. Downloading a firmware update package to a first microcontroller of the device. Determining a firmware update portion and an encrypted hash portion of the firmware update package wherein the encrypted hash portion is cryptographically signed by a signatory. Confirm that the encrypted hash portion conforms to the firmware update by independently computing the hash of the encrypted firmware update portion on the first microcontroller and comparing that value to the signed hash. Other systems and methods are disclosed.

17 Claims, 8 Drawing Sheets

(56) References Cited

U.S. PATENT DOCUMENTS

| | | |
|---|---|---|
| 2004/0088562 A1 | 5/2004 | Vassilev et al. |
| 2004/0103288 A1 | 5/2004 | Ziv et al. |
| 2004/0149827 A1 | 8/2004 | Zuili |
| 2004/0232247 A1 | 11/2004 | Tsunoda et al. |
| 2004/0255145 A1 | 12/2004 | Chow |
| 2005/0035200 A1 | 2/2005 | Hendrick |
| 2006/0043202 A1 | 3/2006 | Kim |
| 2006/0053246 A1 | 3/2006 | Lee |
| 2006/0117190 A1 | 6/2006 | Morita |
| 2006/0126422 A1 | 6/2006 | Takagi et al. |
| 2006/0138217 A1 | 6/2006 | Connelly et al. |
| 2006/0143600 A1* | 6/2006 | Cottrell et al. ............... 717/168 |
| 2006/0161725 A1 | 7/2006 | Lee et al. |
| 2006/0184806 A1 | 8/2006 | Luttmann et al. |
| 2006/0282652 A1 | 12/2006 | El-Haj-mahmoud et al. |
| 2006/0288209 A1* | 12/2006 | Vogler ............................ 713/168 |
| 2007/0002612 A1 | 1/2007 | Chang et al. |
| 2007/0043667 A1 | 2/2007 | Qawami et al. |
| 2007/0061597 A1 | 3/2007 | Holtzman et al. |
| 2007/0124536 A1 | 5/2007 | Carper |
| 2007/0156998 A1 | 7/2007 | Gorobets |
| 2007/0180167 A1 | 8/2007 | Tan et al. |
| 2007/0239935 A1 | 10/2007 | Chen |
| 2007/0283095 A1 | 12/2007 | Chang et al. |
| 2007/0283096 A1 | 12/2007 | Moro et al. |
| 2008/0052532 A1 | 2/2008 | Akkar et al. |
| 2008/0177922 A1 | 7/2008 | Chow et al. |
| 2008/0256363 A1* | 10/2008 | Balacheff et al. ............. 713/187 |
| 2009/0064122 A1* | 3/2009 | Bielski ........................ 717/168 |
| 2009/0095811 A1* | 4/2009 | Kang ............................ 235/380 |
| 2009/0100215 A1 | 4/2009 | Nochimowski |
| 2009/0121028 A1 | 5/2009 | Asnaashari |
| 2009/0121029 A1 | 5/2009 | Asnaashari |
| 2010/0075760 A1 | 3/2010 | Shimabukuro et al. |
| 2010/0229004 A1 | 9/2010 | Asnaashari |

OTHER PUBLICATIONS

PCT/EP2008/065402, International Search Report, Apr. 28, 2009, European Patent Office, P.B. 5818 Patentlaan 2 NL-2280 HV Rijswijk.

PCT/EP2008/065402, Written Opinion of the International Searching Authority, Apr. 28, 2009, European Patent Office, D-80298 Munich.

Gong L et al: "Going beyond the sandbox: an overview of the new security architecture in the Java <TM> Development kit 1.2" Proceeding of the USENIX Symposium on Internet Technologies and Systems, (Dec. 8, 1997) pp. 103-112, XP002100907.

* cited by examiner

SYSTEM AND METHOD FOR SECURE FIRMWARE UPDATE OF A SECURE TOKEN HAVING A FLASH MEMORY CONTROLLER AND A SMART CARD

CROSS-REFERENCE TO RELATED APPLICATIONS

This application is related to the following patent applications co-filed herewith, each filed on Nov. 12, 2007, and each of which is incorporated herein in their respective entireties by reference:

Ser No. 11/938,777 SYSTEM AND METHOD FOR SUPPORTING MULTIPLE TOKENS HAVING A SMART CARD TO CONTROL PARAMETERS OF A FLASH MEMORY DEVICE

Ser. No. 11/938,734 INTELLIGENT CONTROLLER SYSTEM AND METHOD FOR SMART CARD MEMORY MODULES

Ser. No. 11/938,726 SYSTEM AND METHOD FOR UPDATING READ-ONLY MEMORY IN SMART CARD MEMORY MODULES

Ser. No. 11/938,772 SYSTEM AND METHOD FOR USING A SMART CARD IN CONJUNCTION WITH A FLASH MEMORY CONTROLLER TO DETECT LOGON AUTHENTICATION

Ser. No. 11/938,775 SYSTEM AND METHOD DRIVE RESIZING AND PARTITION SIZE EXCHANGE BETWEEN A FLASH MEMORY CONTROLLER AND A SMART CARD

BACKGROUND OF THE INVENTION

The present invention relates generally to secure USB flash memory devices and more particularly to USB flash memory devices having both a microcontroller and a smart card.

With the small physical size of computer memories having large address spaces, it has become possible to store relatively large quantities of data on small portable memory devices. This portability has made it possible for users to literally carry their important data in their pocket either for the purpose of sharing the data with other individuals or to have information available without carrying bulkier and less portable forms of data storage.

USB flash drives are one example of such small portable devices that are becoming a very popular mechanism for storing computerized information and for physically moving the stored information from one computer to another. There are many popular uses; some common uses include personal data transport and data transfer.

With the portability of data storage devices come security risks. There have been several highly publicized cases of private data being lost from misplaced or stolen laptop computers. Similar risks arise with the use of USB flash drives: being small, they are easily misplaced, often they are carried in a user's pocket and can then, like other small items carried in that fashion, inadvertently fall out of the pocket undetected. In the event of loss of the device, if the owner of the device has stored sensitive private information on it, that person would be more comfortable knowing that the private data could not be accessed without authorization, e.g., without being authenticated as the owner of the device.

There is also a growing culture of using USB flash drives to move data to computers belonging to persons other than the owner of the USB flash drive. In that scenario the owner of the USB flash drive provides the USB flash drive to another person for connection to that persons computer via a USB port either for the purpose of receiving data files from the owner of the computer or vice versa. However, because the owner of the USB flash drive does not typically have control of the computer, the USB flash drive owner is subjected to having data moved, intentionally or unintentionally, from the USB flash drive to the computer to which it is being attached, or viewed by the owner of the computer. Furthermore, the owner of the computer could, again either with intent or inadvertently, cause information stored on the USB flash drive to be deleted or corrupted.

Thus it is desirable to avoid the threat of being subjected to some form of attack from the computer to which the drive is attached.

Encryption technology is available on many computers. Thus, one way to avoid some of the aforementioned problems is to use the encryption processing capabilities to encrypt and decrypt files stored on the USB flash memory device. While that solution may work to solve specific needs of particular users, it is not a good general solution to the data security problems that arise with USB flash memory devices. One problem is that multiple encryption standards exist. Thus, the encryption technology used to encrypt a file on one computer may not be available when the same file is to be decrypted on another computer. A more severe issue is that often a user would store the encryption key on the computer with which the USB flash memory device is most often used. Thus, the likelihood that the computer and USB flash memory device are lost together or stolen together is high and consequently a hacker may be able to find the encryption key for the USB flash memory device somewhere on the computer.

To address the above-mentioned concerns, several manufacturers, including, Lexar Media, Inc. of Fremont, Calif. and Kingston Technology Company, Inc. of Fountain Valley, Calif., have introduced USB flash memory devices that provide encryption of a data zone having private data. The encryption and decryption is performed by the USB flash memory microcontroller and the encryption key is stored inside the microcontroller. While this solution provides a higher level of security than USB flash memory devices that have no security features and also improves security with respect to using a host computer for encryption and decryption, it is a solution that is vulnerable to certain attacks. For example, denial of service attacks may be launched against files in the private data zone by deleting files from that area of the device. As discovered by the smart card industry, hackers have developed many clever techniques for deducing the activity inside a microcontroller, for example, examining power consumption patterns, and can use those techniques for determining encryption keys.

From the foregoing it will be apparent that there is still a need for a USB flash memory device that provides yet a higher level of data security to protect data stored on thereon.

DETAILED DESCRIPTION OF THE INVENTION

Figure 1:
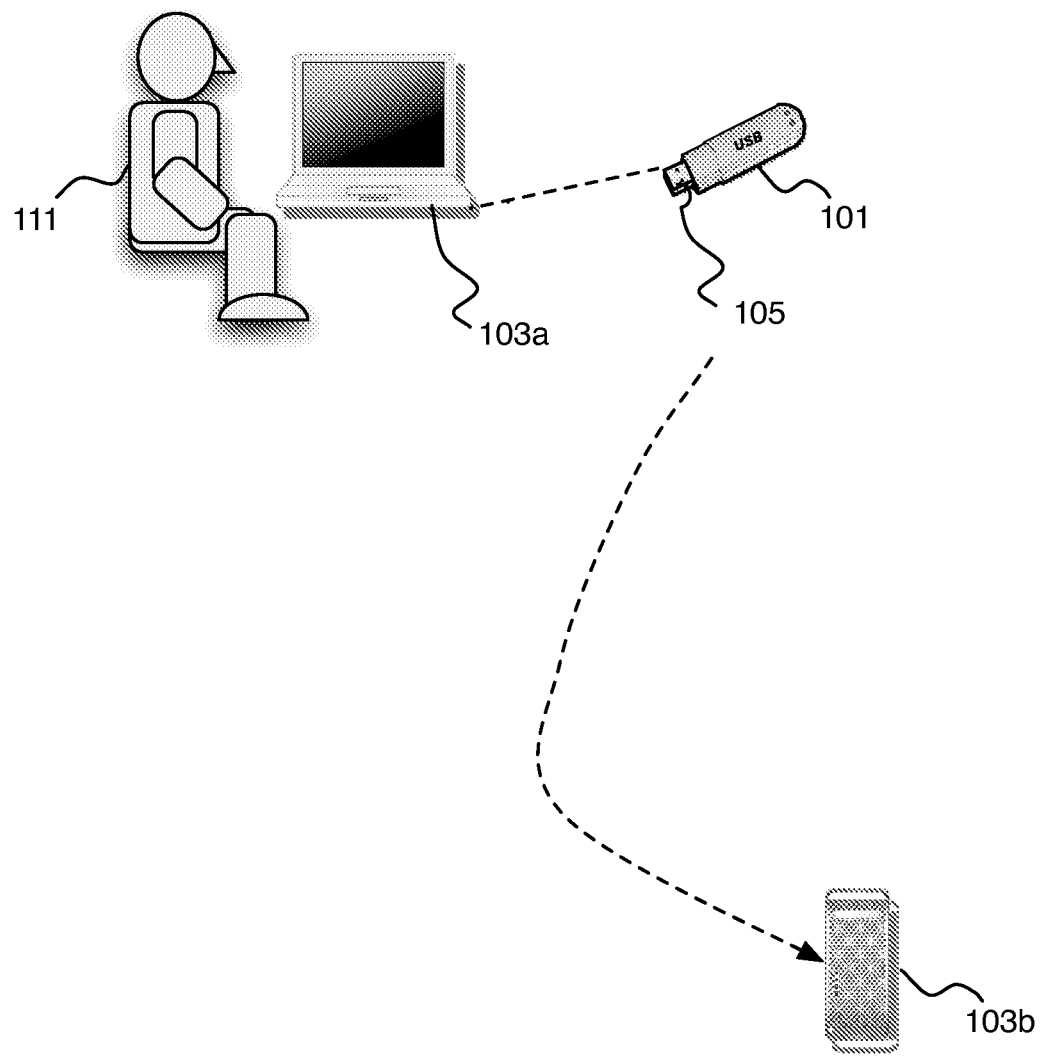
FIG. 1 is a block diagram illustrating a use scenario of a USB flash memory device.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a USB flash drive having a smart card module operating in conjunction with the USB flash drive microcontroller provides an hitherto unavailable level of security. Furthermore, a USB flash drive having a smart card as described herein provides for a secure mechanism to confirm that any firmware updates to the USB flash drive have been independently verified in terms of integrity and authenticity.

FIG. 1 is a schematic diagram illustrating a typical use of a USB flash drive 101. A user 111 operates a computer 103. On that computer the user 111 has stored certain files (not shown). It is often the case that a computer user 111 needs to access these same files at other locations. For example, a user 111 may need to access a file, which was created on a work computer, using his home computer 103. One way to transfer the file would be via a computer network or by sending the file via electronic mail. However, that may not always be practical.

An alternative is to physically move a copy of the file on a storage medium. USB flash drives 101 is one such storage medium. In the example of FIG. 1, a USB flash drive 101a having a USB connector 105 is inserted into a USB port of the user's computer 103a. The USB flash drive 101a then enumerates on the user's computer 103a[1].

[1]Herein, letter suffixes are used in conjunction with reference numerals to designate specific instantiations of a class of objects having common generic features. The class is referred to using numerals only. Thus, 103a is a specific computer 103. Any reference to a device solely by a numerical reference is meant to apply equally to all members of the class unless the context prohibits such an interpretation.

USB enumeration process includes performing a reset operation of a USB flash drive 101 and the USB flash drive 101 is assigned a unique identifier. In the case of a USB mass storage device, like a USB flash drive 101, a drive letter is assigned to the USB flash drive 101 so that a user 111 can access the USB flash drive 101 from his computer. Thus, at the conclusion of the enumeration process the USB flash drive 101 has been assigned a drive letter, e.g., "H:" or "K:", by which the USB flash drive 101 is uniquely identified in the computer's operating system.

After the user 111 has inserted the USB flash drive 101a into the computer 103a and the USB flash drive 101a has enumerated, the user 111 can copy files from the computer 103a to the USB flash drive 101a. At this point, the files have become physically portable and the user 111 can move the files to another computer 103b by inserting the USB flash drive 101a into a USB port of that computer 103b. The user 111 can now read the file using the file browser or application programs on that computer 103b.

Of course, as with other storage drives on a computer, a USB flash drive 101 may be used to create, read, delete and otherwise manipulate files as permitted by the operating system and application programs running on the computers to which it is connected 103.

Figure 2:
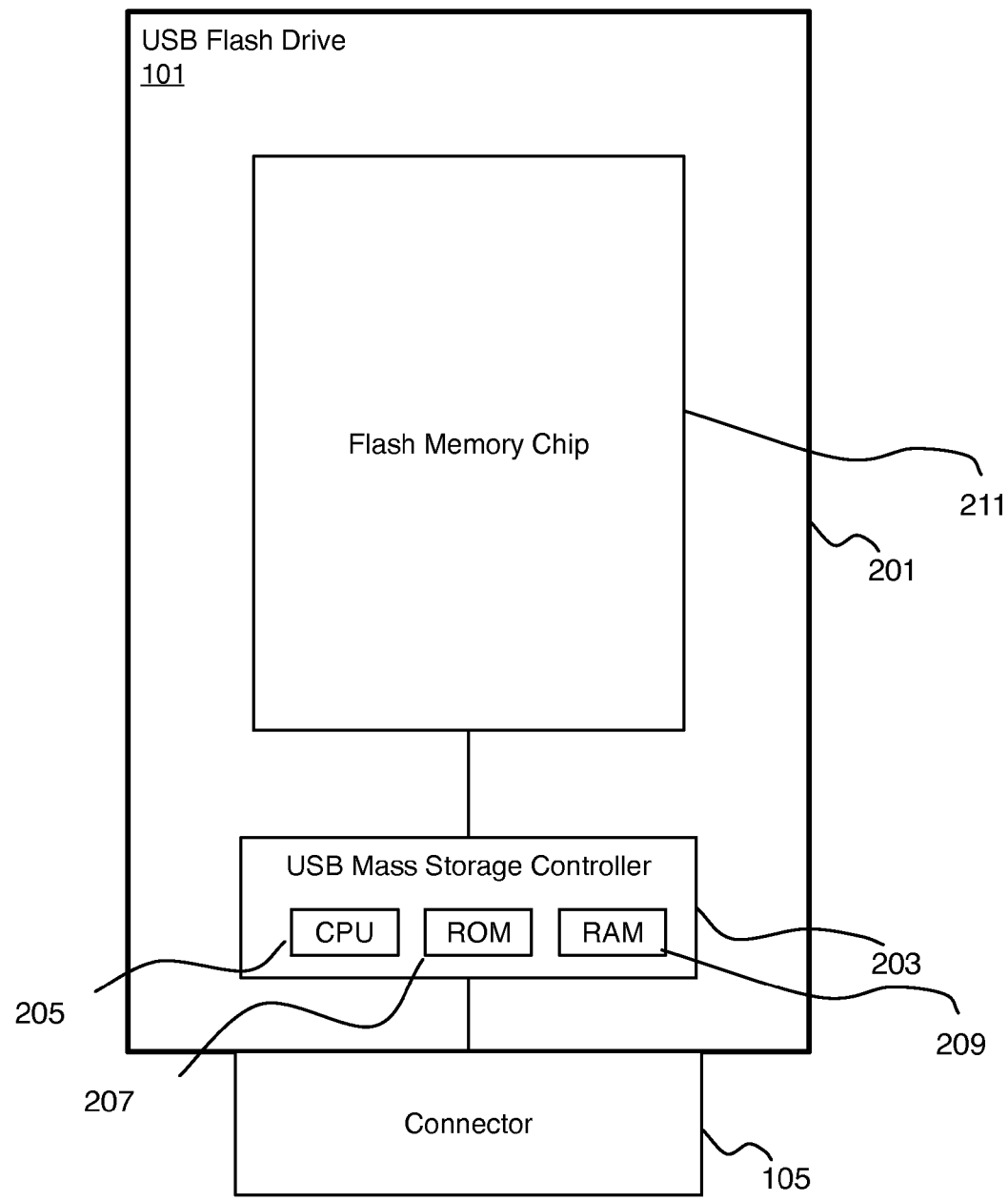
FIG. 2 is a block diagram illustrating a high-level view of the architecture of a prior art USB flash memory device having a USB flash memory microcontroller and a NAND memory storage area.

FIG. 2 is a high-level block diagram illustrating the basic components of a prior art USB flash drive 101. A USB flash drive 101 typically has a hard shell housing 201, e.g., plastic or aluminum, to contain and protect the internal components of the USB flash drive 101. At one end, the USB flash drive 101 has a connector for connecting the USB flash drive 101 to a host computer 103 and to provide a communications interface to the host computer 103 to which it is connected.

A prior art USB flash drive 101 further contains a USB mass storage controller 203. Flash memories are block-oriented and are subject to wear (a limit on the number of read-write cycles that a flash memory can handle). The USB mass storage controller 203 implements a USB host controller and provides a linear interface to block-oriented serial flash devices while hiding the complexities of block-orientation, block erasure, and wear leveling, or wear balancing. The controller contains a small RISC microprocessor 205 and a small amount of on-chip ROM 207 and RAM 209.

A USB flash drive 101 further contains a flash memory chip 211, typically a NAND flash memory chip, for storing data, e.g., computer files.

A USB flash drive 101 further contains a crystal oscillator for producing a clock signal, and may contain LEDs, write protect switches, and a myriad of non-electrical components for aesthetic or portability purposes. These are not important to the present discussion.

As discussed hereinabove, the mainstream prior art USB flash drive 101 is extremely vulnerable to security threats. These devices provide no defense against the risk that the data stored thereon would come into the wrong hands if the device is stolen or lost. Furthermore, when inserted into a stranger's computer 103, the data on a USB flash drive 101 may be either inadvertently or intentionally copied to that computer 103 or be deleted from the USB flash drive 101.

As further discussed hereinabove, there are prior art approaches to provide a certain level of security through the use of encryption services provided directly on the microcontroller 205. An alternative, that provides yet higher security, using a smart card module for providing certain security features is presented here.

Figure 3:
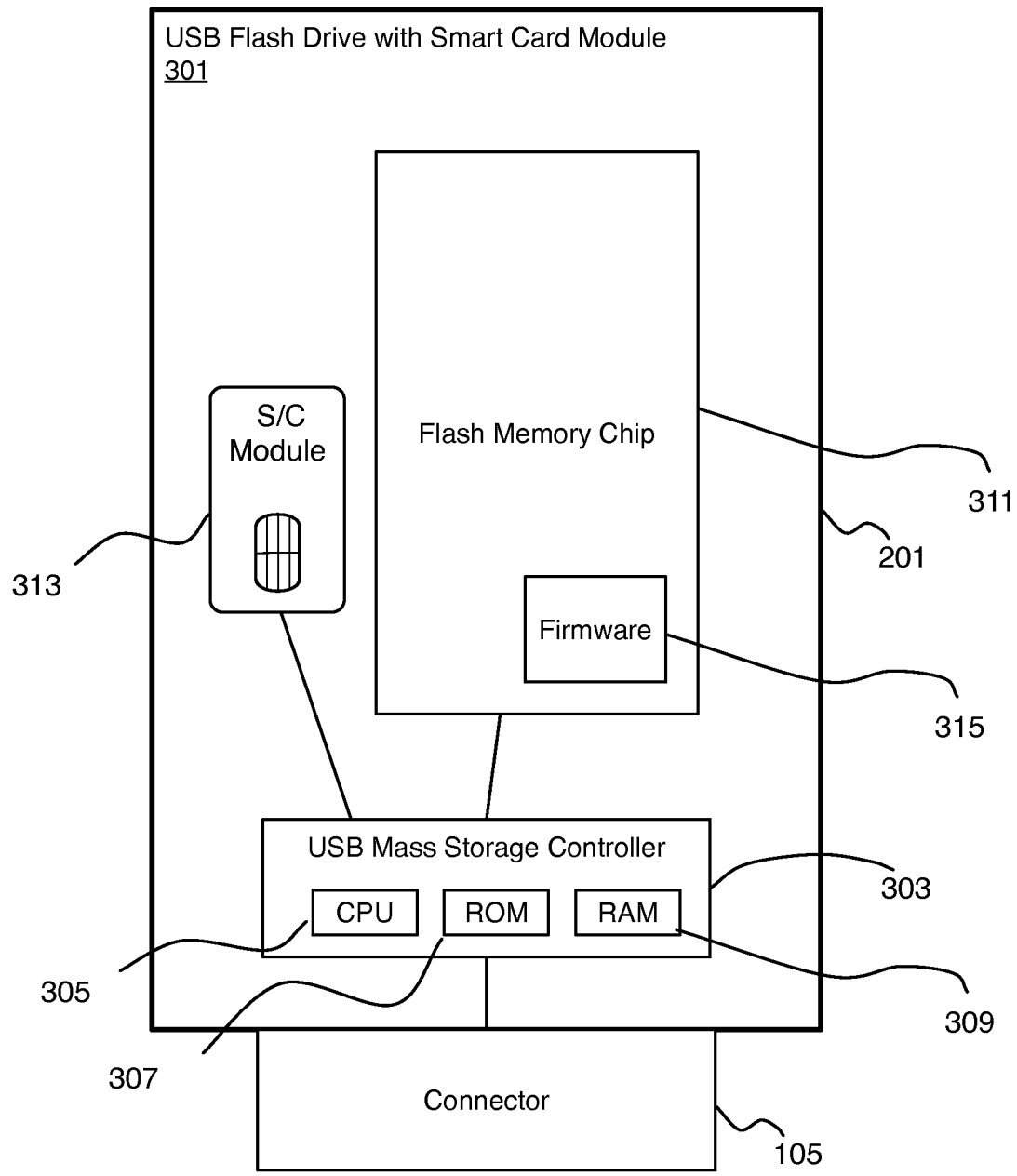
FIG. 3 is a block diagram illustrating a high-level view of the architecture of a USB flash drive incorporating a smart card circuit operating in cooperation with a USB microcontroller.

FIG. 3 is a block diagram illustrating a high-level view of the architecture of a USB flash drive 301 incorporating a smart card module for providing security functionality, e.g., authentication and cryptographic services, to enhance the security of data stored on the USB flash drive 301 (referred to hereinafter as a USB flash drive SC). A USB flash drive SC 301 may be connected to a host computer 103 in a similar fashion as depicted with respect to USB flash drive 101 illustrated in FIG. 1.

As with the prior art USB flash drive 101, a USB flash drive SC 301 is constructed with a USB connector 105 at one end, and has a USB flash drive microcontroller 303 having a microprocessor 305, a ROM 307, and a RAM 309, as well as a flash memory chip 311. Additionally the USB flash drive SC 301 contains a smart card module 313 connected to the USB flash drive microcontroller 303.

In one embodiment, the smart card module 313 is used by the USB flash drive SC 301 to authenticate a user and to provide certain cryptographic capabilities. Thus, for example, when the USB flash drive SC 301 is inserted into a computer 103, a logon screen may be presented to the user 111 requesting the user 111 to authenticate himself using a PIN or password. Authentication is then entirely a negotiation between the host computer 103 and the smart card module 313 with only the result presented to the USB flash drive microcontroller 303.

In one embodiment, the communication between the host computer 103 and the USB flash drive SC 301 is performed using the USB mass storage protocol and the USB CCID (Chip Card Interface Device) protocol.

Operations of the USB flash drive microcontroller 303 are according to instructions stored in a firmware control program 315 stored in the flash memory 311. The firmware control program 315 contains start-up instructions executed on initialization of the USB flash drive SC 301. Several of the start-up procedures are discussed in greater detail hereinbelow.

As discussed hereinabove, USB enumeration is one function performed during startup. The USB flash drive SC 301 enumerates itself as a plurality of a USB mass storage drives and as a smart card interface device (akin to a USB smart card reader) to allow for communication using the CCID protocol. The firmware control program 315 contains the necessary instructions to act as a CCID device when the host computer 103 directs communication to the smart card module 313.

Figure 4:
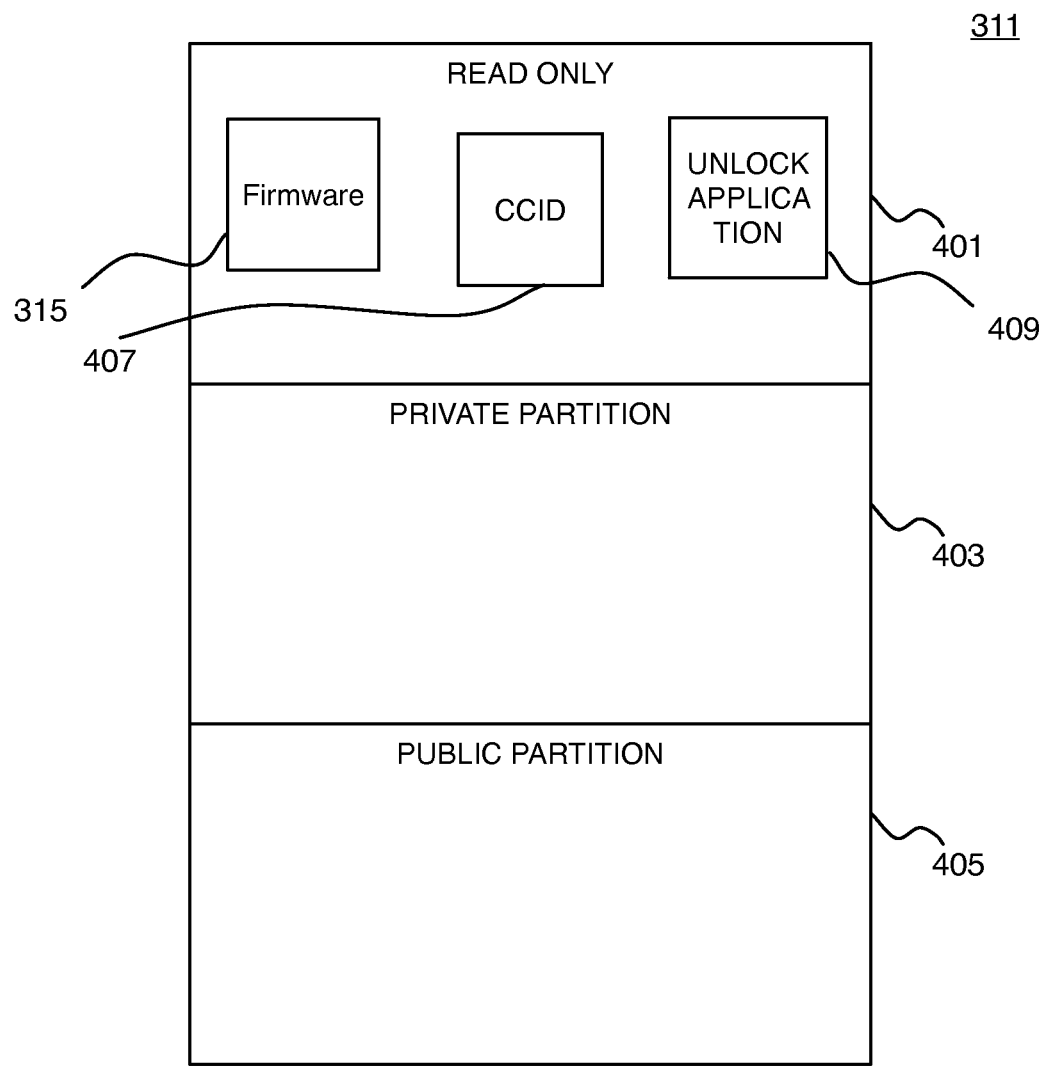
FIG. 4 is a block diagram illustrating an exemplary layout of the addressable space of the memory of the flash memory of the USB flash drive of FIG. 3.

FIG. 4 is a block diagram illustrating an exemplary layout of the addressable space of the memory of the flash memory 311. In one embodiment, the addressable space of the flash memory is partitioned into three partitions: a read only partition 401, a private data partition 403, and a public data partition 405.

The read only partition 401 contains the control program firmware 315 and a CCID module 407 for managing interaction with the host computer 103 over the CCID protocol. In alternative implementations, the communication with the smart card module 313 is carried over the USB Human Interface Device (HID) protocol, or any other suitable communications protocol. For such alternatives, the CCID module 407 would be replaced with communications modules appropriate for such protocols allowing the USB flash drive SC 301 to enumerate as such a device, e.g., as an HID device.

The read only partition 401 also contains a host computer application program, the unlock application 409. The unlock application 409 may be an autorun application that automatically launches on the host computer 103 or may appear as a launchable application when the read only partition 401 is browsed to using the host computer 103 operating system.

The unlock application 409 may be used by a user 111 to perform several tasks associated with managing the USB flash drive SC 301. The unlock application 409 may, for example, be used by the user 111 to authenticate to the USB flash drive SC 301.

The USB flash drive SC 301 enumerates as three USB mass storage partitions, one corresponding to the read only partition 401, one as the private partition 403 and one as the public partition 405.

Upon initialization of the USB flash drive SC 301, the private partition 403 enumerates as a drive without media, i.e., a user 111 would be able to see a drive letter designated for the drive, however, it would appear as an empty disk drive.

Through the unlock application 409 the user 111 may unlock the private partition 403 to have access to files stored therein. In one embodiment, data in the private partition 403 is encrypted using an AES key (e.g., a 256 bit key). The AES key is stored in the smart card module 313. When the user 111 has authenticated using the unlock application 409 the smart card module 313 encrypts the AES key in a manner in which the USB flash drive microcontroller 303 can decrypt. The USB flash drive microcontroller 303 then uses the decrypted AES key to decrypt information stored in the private drive. The USB flash drive microcontroller 303 stores the AES key only temporarily. Thus, when the USB flash drive SC 301 is removed from the host computer 103 the AES key is only stored in the smart card module 313.

Figure 5:
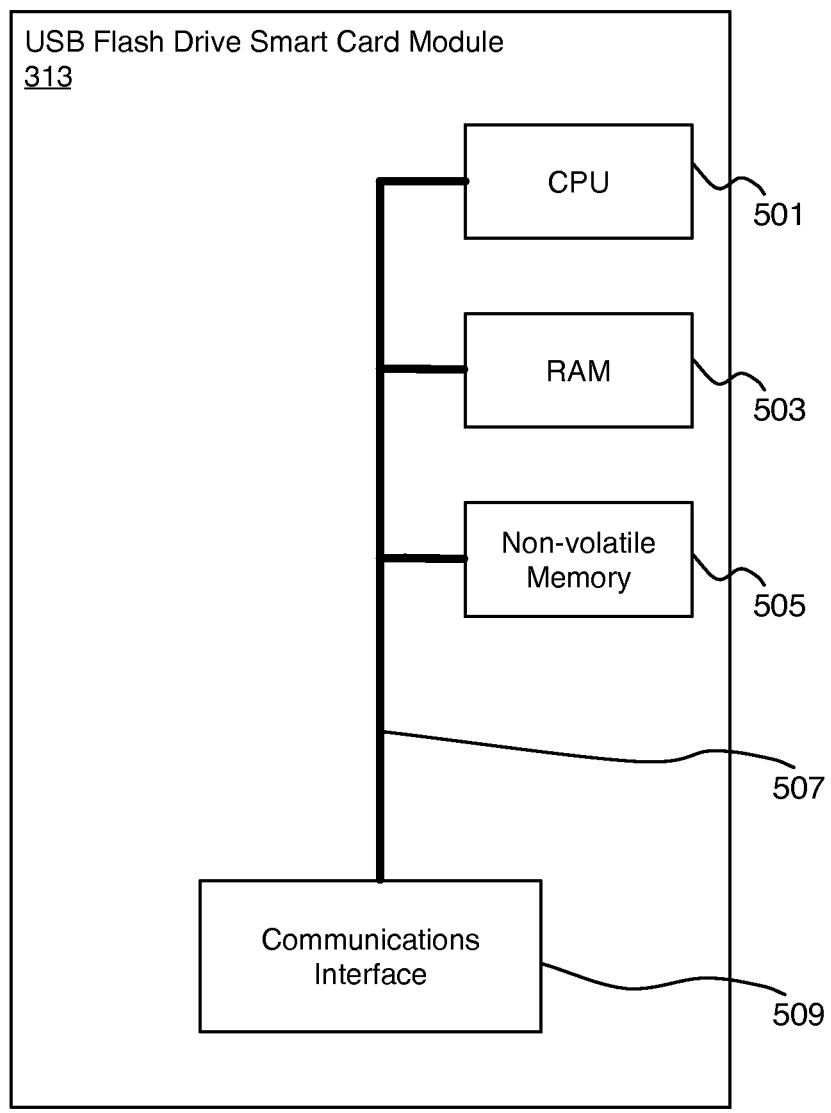
FIG. 5 is a block diagram illustrating a high-level view of the architecture of a smart card module of FIG. 3.

FIG. 5 is a block diagram illustrating a high-level view of the architecture of a smart card module 313 used in the USB flash drive SC 301. The smart card module 313 contains a central processing unit 501, a RAM 503, and a non-volatile memory 505. These components are connected via a bus 507. Also connected to the bus 507 is a communications interface 509 for providing a connection between the bus 507, and consequently, the CPU 501, RAM 503, and non-volatile memory 505, and the USB flash drive microcontroller 303.

In one embodiment communication between the USB flash drive microcontroller 303 and the smart card module 313 is over the ISO-7816 APDU protocol. Several special instructions are added to facilitate particular interactions required for coordinating the operations of the smart card module 313 and the USB flash drive microcontroller 303.

An important feature of smart cards is their resistance to attacks to discern the information stored therein. Smart cards employ various techniques to avoid attempts at unauthorized access thereto. Furthermore, When microprocessor-based smart cards are used for strong authentication, they offer several advantages, including data storage capacity, processing power, portability and ease-of-use. Smart card-based solutions are inherently more secure than other types of security tokens because they can be used to create a unique, non-reusable password for each authentication event, store personal data, and they do not transmit personal or private data over the network. When used for PKI applications, the smart card device provides core PKI services, including encryption, digital signature and private key generation and storage.

It is often desirable to improve the functionality of a firmware-controlled device by allowing for updates to the firmware. In the context of the USB flash drive SC 301 firmware updates could be called for to add new functionality, to maintain compatibility with host computer 103 operating system changes, to provide compatibility with new operating systems, to correct bugs, or even security holes unknown at the time of initial deployment.

On initial start up, the USB flash drive SC 301 boots up using a ROM based firmware stored in the ROM of the USB flash drive microcontroller 303. From there, the firmware 315 is bootstrapped into the RAM 309 thereby overriding firmware instructions permanently stored in the ROM 307.

In prior art USB flash drives 101, firmware updates do not present a security issue because no data security is provided for in such USB flash drives 101. However, in the case of USB flash drive SC 301, to ensure the benefits described above of using a smart card module 313, in one embodiment, the security of the USB flash drive SC 301 is further ensured by protecting the integrity and authenticity of the firmware 315 so that a malicious third party does not cause the installation of a firmware 315 that circumvents or bypasses the security features provided by the smart card module 313.

Figure 6:
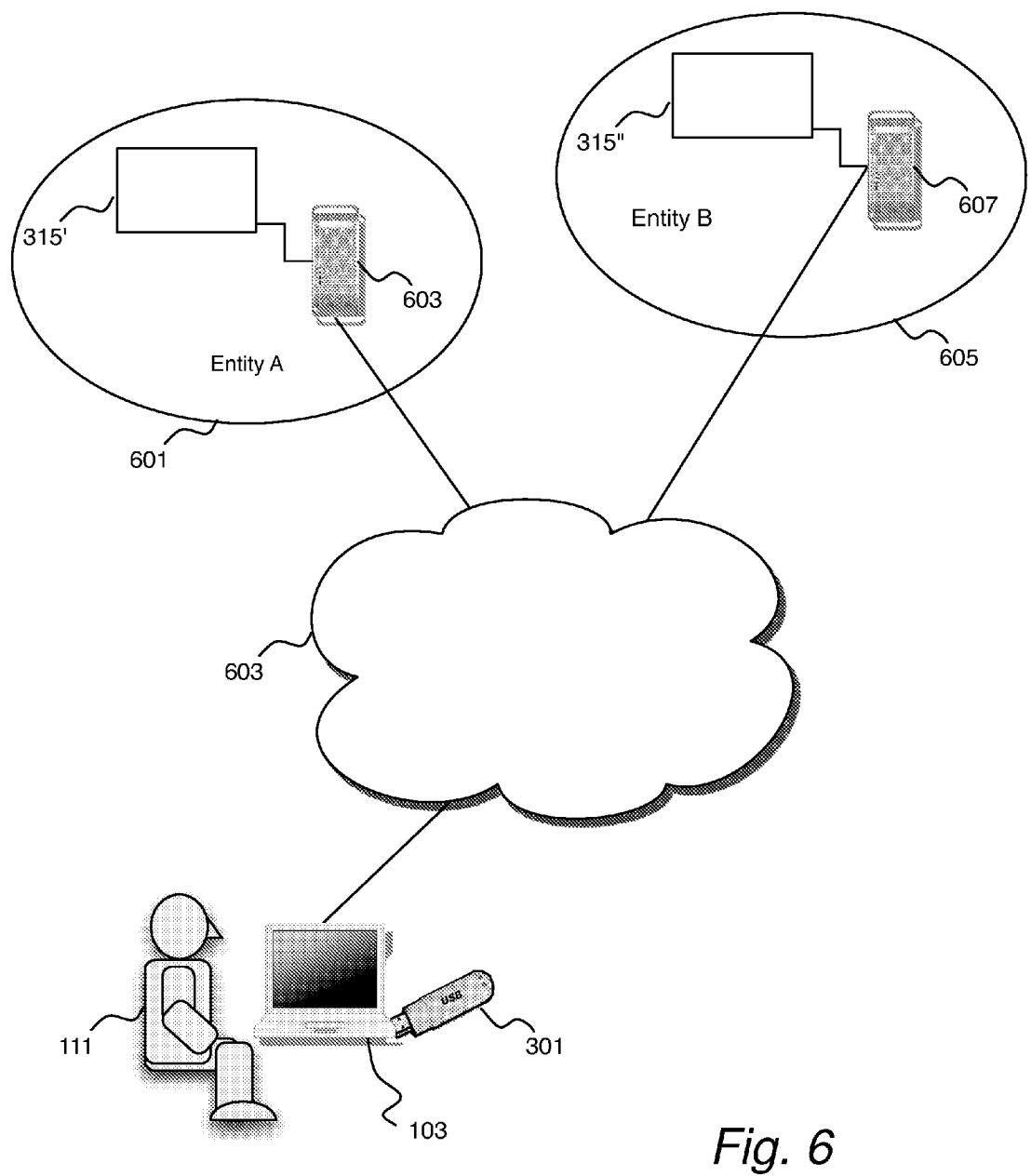
FIG. 6 is a schematic illustrating of a computer network and illustrates the participants in a firmware update for a USB flash drive of FIG. 3.

FIG. 6 is a schematic illustrating of a computer network and illustrates the participants in a firmware update for a USB flash drive SC 301. A firmware update 315' is created by an Entity A 601. Typically the entity A 601 is a manufacturer of the USB flash drive microcontroller 303. Only in rare circumstances would a third party update the firmware 315. The firmware update 315' may be stored on a server computer 603. The Entity A 601 then transmits, for example, via a network 603 over email or ftp (file transfer protocol), the firmware update 315' to an Entity B 605 that has authority to validate a firmware update 315'. Only if validated by the authorized entity, i.e., in this example, by Entity B 605 does the smart card module 313 allow the firmware update 315' to be installed. The Entity B 605 creates a validated firmware update 315" and makes it available for download by the user 111 operating the USB flash drive SC 301 on an host computer 103.

There are various mechanisms by which a user 111 may become aware of the availability of a firmware update 315'. For example, if connected to the network 603, the firmware 315 itself may poll Entity B 605 to determine availability of a firmware update 315".

Figure 7:
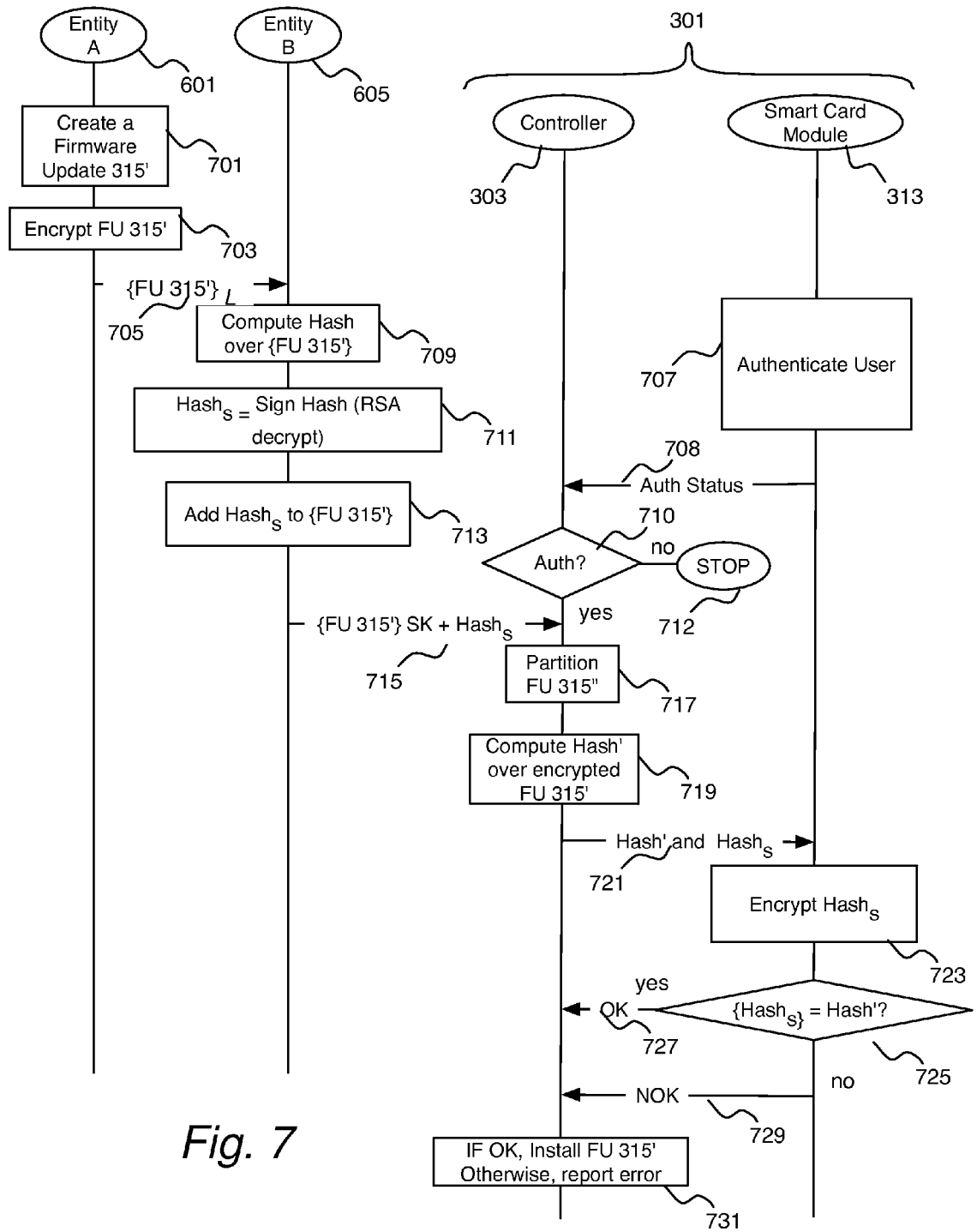
FIG. 7 is a timing sequence diagram illustrating the interaction between the various entities of FIG. 6 to ensure that only a valid and certified firmware update is installed.

FIG. 7 is a timing sequence diagram illustrating the interaction between the various entities of FIG. 6 to ensure that only a valid and certified firmware update 315" is installed.

The Entity A 601 creates a firmware update 315', step 701, and encrypts the firmware update 315' using a static key L, e.g., an AES key, step 703. The encrypted firmware is transmitted to the validating authority, Entity B 605, step 705.

To ensure that the firmware update 315' is not manipulated after it has validated the firmware update 315', the validating authority Entity B 605 computes a cryptographic hash, hash, over the code of the firmware update 315' using a pre-agreed-upon algorithm, e.g., SHA-1, SHA-2, or MD5, step 709. Such hashing algorithms are wellknown and have as a common characteristic in that it is nearly impossible to make any changes to the input without altering the computed hash value. Thus, a third party or Entity A 601 would not be able to make any changes to the firmware update 315' without affecting the hash value. In other words, hash=hashfunction ($\{FW\}_L$) where FW is the firmware code and L is the symmetric key of Entity A 605. L is not known to Entity B.

Figure 8:
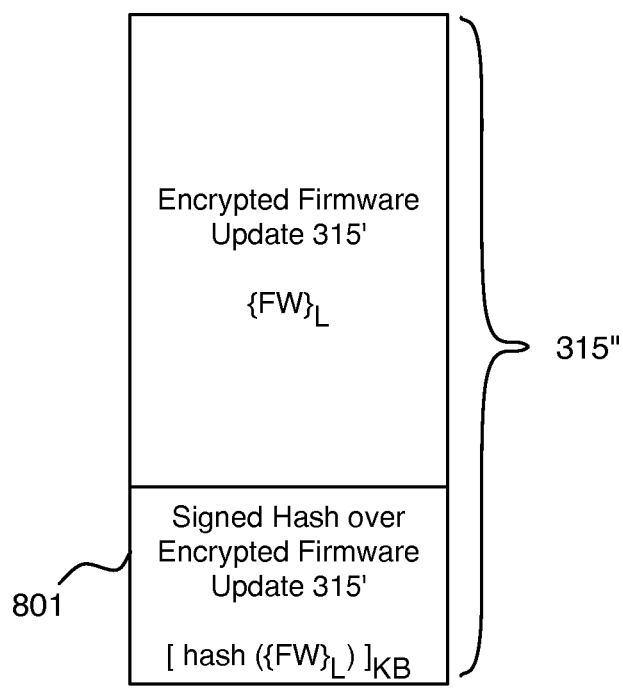
FIG. 8 which is a block diagram illustrating the components of the firmware update package

Next the Entity B 605 cryptographically signs the hash value, $[hash]_{KB}$, step 711. The Entity B 605 cryptographically signs the hash value by decrypting the hash using its private key KB. The signed hash value $[hash]_{KB}$ is then appended to the firmware update 315' producing a firmware update package 315" illustrated in FIG. 8 which is a block diagram illustrating the components of the firmware update package 315", step 713. The firmware update package 315" consists of the encrypted firmware update 315' and the signed hash of the encrypted firmware update 315'.

In one embodiment of firmware update discussed herein, the Entity B 605 signs the hash value using an asymmetric cryptography algorithm such as RSA. In that embodiment the Entity B 605 signs the hash using the private key of Entity B 605. The corresponding private key is securely stored in the smart card module 313 and only known to the smart card module 313.

The firmware update package 315" is next published to allow end-users of the USB flash drive SC 301 to download and install the firmware update package 315". Prior to being able to install the firmware update package 315", the user 111 should be authenticated to the smart card module 313, step 707. To further enhance the authentication, the authentication could be made mutual so that the user can be certain that smart card module 313 has not been compromised, e.g., clandestinely replaced with an impostor smart card module that always provides an authentication verification, i.e., a so-called yes machine. The authentication status is transmitted to the USB flash drive microcontroller 303, step 708. If the authentication status is OK, step 710, the download and install procedure may continue; otherwise, the process terminates with an error message, step 712.

To further enhance the security of the download and install of the firmware operation, a secure communication channel is established between the USB flash drive microcontroller 303 and the smart card module 313. This secure communication channel also ensures that the smart card module 313 has not been replaced with a yes machine and that snooping on the communication path between the smart card module 313 and the USB flash drive microcontroller 303 does not provide a mechanism for illicit appropriation of the firmware update 315' or other information exchanged between the USB flash drive microcontroller 303 and the smart card module 313.

The firmware update package 315" is downloaded to the USB flash drive SC 301, in particular to the USB flash drive microcontroller 303, step 715. The location of the encrypted and signed hash value is known. For example, a SHA-1 message digest (hash) is 160 bits long. With padding, it may be preordained that the last 256 bits of the firmware update package 315" contains the signed encrypted hash.

The transmission step 715 may be initiated from the host computer 103 using, for example, the unlock application 409.

The USB flash drive microcontroller 303, having received the firmware update package 315", partitions the firmware update package 315" into the encrypted firmware update 315' $\{FW\}_L$ and the signature, namely, the signed hash of the encrypted firmware update 315', $hash_S$, step 717. To verify that the version of the firmware update 315' that has been validated by the Entity B 605, it is possible to re-compute the hash over the encrypted firmware update 315' and ask the smart card module 313 to confirm that the recomputed hash value corresponds to the signed hash value, $hash_S$. Accordingly, the USB flash drive microcontroller 303 independently computes the hash value over the encrypted firmware update 315', hash', step 719, and transmits both the signed hash value, $hash_S$, and the by-the USB flash drive microcontroller 303 computed hash value, hash', to the smart card module 313 as a request to validate the firmware update 315', step 721.

Normally all commands for the smart card module 313 that are received by the USB flash drive microcontroller 303 from the host computer 103 are passed directly (after appropriate stripping of headers on the carrying protocol frames) to the smart card module 313. However, certain commands that are only relevant to the interaction of the USB flash drive microcontroller 303 and smart card module 313 are not permitted to be issued by the host computer 103 (or any upstream network devices). The command to request validation of the firmware update 315' is one such command that may only be sent by the USB flash drive microcontroller 303. Thus, if another entity, notably the host computer 103, attempts to transmit the request validation command to the smart card module 313 the USB flash drive microcontroller 303 traps that instruction and does not permit the instruction to be transmitted to the smart card module 313.

Having received the request to validate firmware update 315' instruction, the smart card module 313 decrypts the signed hash, {hash$_S$}, and thereby recovers the hash value computed by Entity B 605 in step 711, step 723.

The smart card module 313 compares the two hash values, the hash value computed by Entity B 605, hash, and the hash value computed by the USB flash drive microcontroller 303, hash'. If the hash values hash and hash' are equal, step 725, the smart card module 313 has confirmed integrity and authenticity of the firmware update 315', in which case the smart card module 313 sends an "OK" acknowledgement to the USB flash drive microcontroller 303, step 727. Otherwise, the smart card module 313 indicates its disapproval of the firmware update package 315" by responding with a "NOK" message, step 729.

If the USB flash drive microcontroller 303 receives an "OK" from the smart card module 313, the USB flash drive microcontroller 303 installs the firmware update 315' by overwriting the firmware module 315 in the flash memory 311, otherwise, the USB flash drive microcontroller 303 informs the host computer 103 that the firmware update package 315" was rejected.

It should be noted that while the description of the process of FIG. 7 is described herein as actions taken by certain entities involved, e.g., the USB flash drive microcontroller 303 and the smart card module 313, in one embodiment, these actions are performed by the USB flash drive microcontroller 303 and smart card module 313 under direction of control software. Thus, the operations of the USB flash drive microcontroller 303 are directed by instructions in the firmware 315 to perform the aforementioned tasks carried out by the USB flash drive microcontroller 303. Similarly, the actions of the smart card module 313 described hereinabove are carried out in response to instructions in the control software for the smart card module 313 typically stored in the non-volatile memory 505 of the smart card module 313.

Although specific embodiments of the invention have been described and illustrated, the invention is not to be limited to the specific forms or arrangements of parts so described and illustrated. The invention is limited only by the claims.

We claim:

1. A method of operating a device to securely update the control firmware controlling the device, the method comprising:
   downloading a firmware update package to a first microcontroller of the device;
   operating the first microcontroller to:
      determine a firmware update portion and an encrypted hash portion of the firmware update package wherein the encrypted hash portion is cryptographically signed by a signatory;
      calculate a hash of the firmware update portion;
      transmit the calculated hash and the signed and encrypted hash portion to a second microcontroller;
   operating the second microcontroller to:
      decrypt the encrypted hash and verifying that the signatory of the encrypted hash portion is an entity entrusted with certifying firmware updates for the device;
      transmit a message denying permission to install the firmware update to the first microcontroller if the computed hash and the encrypted hash do not match or if the signatory of the encrypted hash was not verified as an authorized signatory for firmware updates; and
      transmit a message granting permission to install the firmware update to the first microcontroller if the computed hash and the encrypted hash match and if signatory of the encrypted hash was verified as an authorized signatory for firmware updates; and
   upon receiving a message granting permission to install the firmware update, operating the first microcontroller to update the firmware of the device.

2. The method according to claim 1, further comprising:
   encrypting the firmware update portion using a symmetric key cryptography method using a key of a first entity;
   operating the first microcontroller to decrypt the firmware update portion, using a key stored in the first microcontroller, prior to updating the firmware of the device.

3. The method according to claim 1 wherein the firmware update portion is encrypted by a first entity and the hash portion of the firmware update package is computed, encrypted, cryptographically signed, and added to the firmware update portion by a second entity.

4. The method according to claim 3 wherein the hash portion is signed and encrypted using a public key of the second entity and wherein the hash portion is decrypted by the second processor using a private key of the second entity.

5. The method according to claim 3 wherein the second entity is an entity authorized to grant permission for firmware updates of the device.

6. The method according to claim 3 wherein the hash portion is signed and encrypted using a public key of the second entity and wherein the hash portion is decrypted by the second processor using a private key of the second entity.

7. The method according to claim 1 wherein the second microcontroller is a smart card.

8. The method according to claim 1 wherein the device comprises a USB flash memory, a USB communications interface, and wherein the first microcontroller is a flash memory microcontroller.

9. The method according to claim 1 wherein the firmware update portion is encrypted by a first entity and the hash portion of the firmware update package is computed, encrypted, cryptographically signed, and added to the firmware update portion by a second entity.

10. A device having the capability to securely update the control firmware controlling the device, comprising:
    a first microcontroller;
    a memory module connected to the first microcontroller;
    a second microcontroller connected to the first microcontroller;
    wherein the first microcontroller is controlled by a firmware including instructions to:
       download a firmware update package to a first microcontroller of the device;
       determine a firmware update portion and an encrypted hash portion of the firmware update package wherein the encrypted hash portion is cryptographically signed by a signatory;
       calculate a hash of the firmware update portion;
       transmit the calculated hash and the signed and encrypted hash portion to a second microcontroller;
    wherein the second microcontroller is controlled by firmware to cause the second microcontroller to:
       decrypt the encrypted hash and verifying that the signatory of the firmware update package is an entity entrusted with certifying firmware updates for the device;

transmit a message denying permission to install the firmware update if the computed hash and the encrypted hash do not match or if signatory of the encrypted hash was not verified as an authorized signatory for firmware updates; and transmit a message granting permission to install the firmware update if the computed hash and the encrypted hash match and if signatory of the encrypted hash was verified as an authorized signatory for firmware updates; and wherein the first microcontroller further is controlled by firmware to update the firmware of the device if the second microcontroller has granted permission to install the firmware update.

11. The device according to claim 10 wherein the hash portion is signed and encrypted using a public key of a second entity, the device further comprising firmware to cause the second microprocessor to decrypt the hash portion using a private key of the second entity corresponding to the public key of the second entity.

12. The device according to claim 11 wherein the second entity is an entity authorized to grant permission for firmware updates of the device.

13. The device according to claim 10 wherein the second microcontroller is a smart card.

14. The device according to claim 10 wherein the device comprises a USB flash memory, a USB communications interface, and wherein the first microcontroller is a flash memory microcontroller.

15. The device according to claim 10 wherein the firmware update portion is encrypted by a first entity and the hash portion of the firmware update package is computed, encrypted, cryptographically signed, and added to the firmware update portion by a second entity, the first microcontroller further comprising instructions to decrypt the firmware update portion, using a key stored in the first microcontroller, prior to updating the firmware of the device.

16. A method for coordinating a firmware update to a flash memory device between a first entity and a second entity such that the first entity creates the firmware update and the second entity authorizes the firmware update, the method comprising:

operating the first entity to create a firmware update package;

transmitting the firmware update package from the first entity to the second entity;

operating the second entity to cryptographially sign the firmware update package;

downloading a firmware update package to a first microcontroller of the flash memory device;

operating the first microcontroller to:

determine a firmware update portion and an encrypted hash portion of the firmware update package wherein the encrypted hash portion is cryptographically signed by a signatory;

calculate a hash of the firmware update portion;

transmit the calculated hash and the signed and encrypted hash portion to a second microcontroller of the flash memory device;

operating the second microcontroller to:

decrypt the encrypted hash and verifying that the signatory of the encrypted hash portion corresponds to the second entity;

transmit a message denying permission to install the firmware update to the first microcontroller if the computed hash and the encrypted hash do not match or if the signatory of the encrypted hash was not verified as the second entity; and transmit a message granting permission to install the firmware update to the first microcontroller if the computed hash and the encrypted hash match and if signatory of the encrypted hash was verified as signed by the second entity; and upon receiving a message granting permission to install the firmware update, operating the first microcontroller to update the firmware of the device.

17. The method of updating the firmware of a device of claim 16, and further comprising:

encrypting the firmware update portion using a symmetric key cryptography method using a key of the first entity;

operating the first microcontroller to decrypt the firmware update portion, using a key stored in the microcontroller, prior to updating the firmware of the device.

* * * * *